Patented Oct. 7, 1924.

1,510,739

UNITED STATES PATENT OFFICE.

ROBERT W. COOK, OF ROCHESTER, NEW YORK, ASSIGNOR TO EASTMAN KODAK COMPANY, OF ROCHESTER, NEW YORK, A CORPORATION OF NEW YORK.

PROCESS OF REMOVING WATER FROM NITROCELLULOSE FIBERS.

No Drawing. Application filed June 26, 1923. Serial No. 647,952.

*To all whom it may concern:*

Be it known that I, ROBERT W. COOK, a citizen of the United States of America, residing at Rochester, in the county of Monroe and State of New York, have invented certain new and useful Improvements in Processes of Removing Water from Nitrocellulose Fibers, of which the following is a full, clear, and exact specification.

This invention relates to a process of removing water from nitrocellulose fibers, particularly between the washing and plasticizing operations. One object of the invention is to provide a rapid and inexpensive method by which water may be removed from the fibers, using for this purpose liquids which have hitherto been considered unsuitable. Other objects will hereinafter appear.

When cellulose fibers are nitrated, the acid is customarily removed therefrom by washing in water. The excess of water is then wrung out by mechanical means, such as centrifugals, as far as is commercially practicable, but the water clinging to the washed fibers after centrifugalizing is more than that permissible when mixing the fibers with solvents to make solutions or plastics.

I have discovered that this surplus water may be readily removed by treating the wet fibers with a mixture of a nitrocellulose liquid solvent and water, the solvent being miscible with water and being present in such a proportion that the mixture has a capacity for taking up considerably more water than that which is initially present therein. The amount of water initially present in the mixture is sufficient to prevent substantial dissolving of the nitrocellulose fibers during the treatment. In this way agglomerating or substantial sticking together of the fibers is prevented. If such sticking together were allowed to take place, an unmanageable putty-like mass would be obtained. Suitable solvents having the necessary qualifications are, for example, methyl alcohol and acetone. By the term solvents I include those substances which, when used alone, are capable of making practical nitrocellulose solutions, in contradistinction to substances like ethyl, propyl, butyl, and amyl alcohols, which are not used alone but are employed in admixture with camphor, ether or similar materials.

The quantity of water initially mixed with the solvent may vary widely and is determined by the characteristics of the nitrocellulose fibers. Less water is needed where the nitrocellulose fibers are of lower solubility in the particular solvent employed in the mixture. Moreover, the amount of water in the treating mixture may be lessened where the treatment is hurried or where the dissolving of the fibers into dopes or plastics takes place immediately after the removal of the excess water. As the mixture takes up water from the wet fibers the amount of water initially present in the mixture can be lessened the more moisture there is in the mass to be treated. This is especially true where the dehydration takes place in several stages, the amount of water in the mixture being less during the first of such stages.

I will now describe by way of illustration one embodiment of my process. The nitrated fibers are thoroughly washed with water to remove the acid, in the customary manner. The wet fibers are then mechanically treated, as in a centrifuge, to press or wring out as much water as is practicable. The water which remains may for example be from 40 to 60% by weight of the nitrocellulose. This is obviously more than is desirable when the fibers are to be made into solutions or plastics by means of solvents.

The centrifugalized wet fibers are then treated with a mixture of liquid solvent and water, say for instance a mixture of 97 to 75 parts by weight of methyl alcohol and 3 to 25 parts of water. This water-removing mixture is thoroughly percolated through the mass of fibers. In ordinary practice I may use from 5 to 10 times of the weight of nitrocellulose to be treated. After the water in the fibers has been taken up as far as is practical by the percolated mixture, the excess of liquid is removed mechanically, preferably in a centrifuge. The treating step can obviously be repeated until the amount of water left in the fibers is practically no greater than that entering the mass of fibers through the mixture. This is small enough for many dissolving and plasticizing purposes. If it is desired to eliminate even this small amount of water still remaining, it can be done by any of the usual methods, such as by employing a small amount of substantially anhydrous butyl alcohol in the manner indicated in United States Patent No. 1,398,911, Paul C. Seel, Nov. 29, 1921. However, I find that my dehydrating mixture eliminates enough water so that the residue does not impair dopes formed by many of the usual solvents.

Having thus described my invention, what I claim as new and desire to secure by Letters Patent is:

1. In the process of removing water from wet nitrocellulose fibers, the step of treating said fibers with a mixture of a water-miscible nitrocellulose liquid solvent and water, the proportion of solvent being sufficient to take up more water than that initially present in said mixture, and the proportion of water being sufficient to prevent substantial sticking together of the nitrocellulose fibers.

2. In the process of removing water from wet nitrocellulose fibers, the step of treating said fibers with a mixture of methyl alcohol and water, the methyl alcohol being sufficient to take up more water than that initially present in said mixture, and the water initially in said mixture being sufficient to prevent substantial dissolving of the fibers during said step.

3. In the process of removing water from wet nitrocellulose fibers, the step of treating said fibers with a mixture of 97 to 75 parts by weight of methyl alcohol and 3 to 25 parts of water.

4. The process of treating nitrocellulose fibers which comprises the steps of washing the same, mechanically removing a part of the water, passing into the mass of said wet fibers a mixture of a water-miscible nitrocellulose liquid solvent and water, the proportion of solvent being sufficient to take up more water than that initially present in said mixture, and the proportion of water being sufficient to prevent substantial sticking together of the fibers, and then removing said mixture from said mass as far as practicable.

5. The process of treating nitrocellulose fibers which comprises the steps of washing the same, expressing part of the water, passing into the mass of fibers a mixture of 97 to 75 parts by weight of a liquid nitrocellulose solvent and 3 to 25 parts of water, and expressing part of said mixture from said mass.

Signed at Rochester, New York, this 15th day of June, 1923.

ROBERT W. COOK.